US007721925B1

(12) United States Patent
Graffy et al.

(10) Patent No.: US 7,721,925 B1
(45) Date of Patent: May 25, 2010

(54) UNIVERSAL REMOVABLE ROOF RACK MOUNTING SYSTEM

(76) Inventors: Thomas F. Graffy, 1125 Capri Way, Oxnard, CA (US) 93035; Stepan Gevorkyan, 1348 Thompson Way, Glendale, CA (US) 91201

( * ) Notice: Subject to any disclaimer, the term of this patent is extended or adjusted under 35 U.S.C. 154(b) by 1128 days.

(21) Appl. No.: 10/976,640

(22) Filed: Oct. 28, 2004

(51) Int. Cl.
*B60R 9/058* (2006.01)
*B60R 9/052* (2006.01)

(52) U.S. Cl. .................. 224/329; 224/322; 224/326

(58) Field of Classification Search ............. 224/329, 224/314, 322, 325, 326, 327, 309, 330, 317, 224/310, 33; 410/103, 106, 107, 108
See application file for complete search history.

(56) References Cited

U.S. PATENT DOCUMENTS

| | | | | | |
|---|---|---|---|---|---|
| 2,436,228 | A | * | 2/1948 | Purchase | 224/314 |
| 3,899,111 | A | * | 8/1975 | Binding et al. | 224/330 |
| 4,496,089 | A | * | 1/1985 | Eklund | 224/329 |
| 4,972,983 | A | * | 11/1990 | Bott | 224/326 |
| 4,993,615 | A | * | 2/1991 | Arvidsson | 224/309 |
| 5,143,267 | A | * | 9/1992 | Cucheran et al. | 224/321 |
| 5,232,138 | A | * | 8/1993 | Cucheran | 224/321 |
| 5,282,562 | A | * | 2/1994 | Legault | 224/329 |
| 5,366,128 | A | * | 11/1994 | Grim | 224/330 |
| 5,431,570 | A | * | 7/1995 | Gibbs et al. | 439/39 |
| 5,624,266 | A | * | 4/1997 | Gibbs et al. | 439/34 |
| 5,641,107 | A | * | 6/1997 | Mann | 224/331 |
| 5,762,247 | A | * | 6/1998 | Cucheran et al. | 224/321 |
| 5,947,355 | A | * | 9/1999 | Cucheran et al. | 224/321 |
| 5,988,471 | A | * | 11/1999 | Lundgren | 224/329 |
| 6,010,048 | A | * | 1/2000 | Settelmayer | 224/321 |
| 6,662,982 | B1 | * | 12/2003 | Pakkila | 224/329 |
| 6,905,053 | B2 | * | 6/2005 | Allen | 224/321 |

FOREIGN PATENT DOCUMENTS

DE 4308808 C1 * 3/1994

* cited by examiner

*Primary Examiner*—Nathan J Newhouse
*Assistant Examiner*—Corey N Skurdal
(74) *Attorney, Agent, or Firm*—Kenneth L. Green

(57) ABSTRACT

A universal roof rack mounting system includes small, nearly imperceptible, permanently attached pads and removable cross bar towers. The pads extend only about one quarter inch from an automobile roof and may be painted to match the color of the roof. The cross bar towers may be quickly and easily attached and detached from the pads, and the cross bar towers include a passage which accepts known roof rack cross bars including, both round and rectangular cross bars. An adjustable latching action between the pads and the cross bar towers allows a range of cross bar tower lean angles, thereby allowing the mounting system to adapt to any vehicle roof. The cross bar towers include locking release covers, and the cross bar towers are easily removed, with or without cross bars attached, by unlocking and lifting the tower covers, and the rack system can be lifted off as a unit.

19 Claims, 7 Drawing Sheets

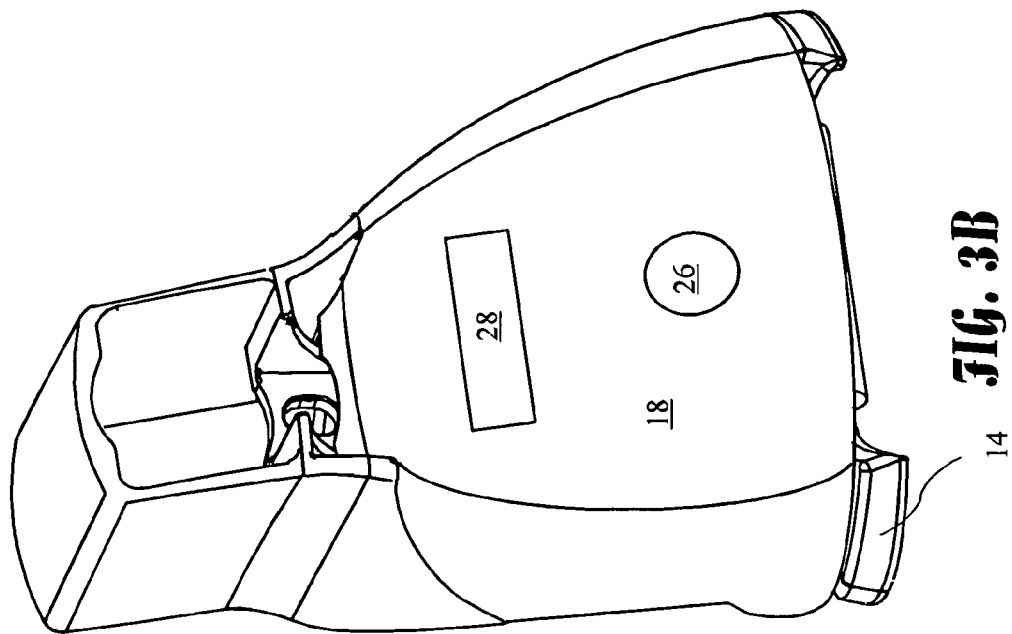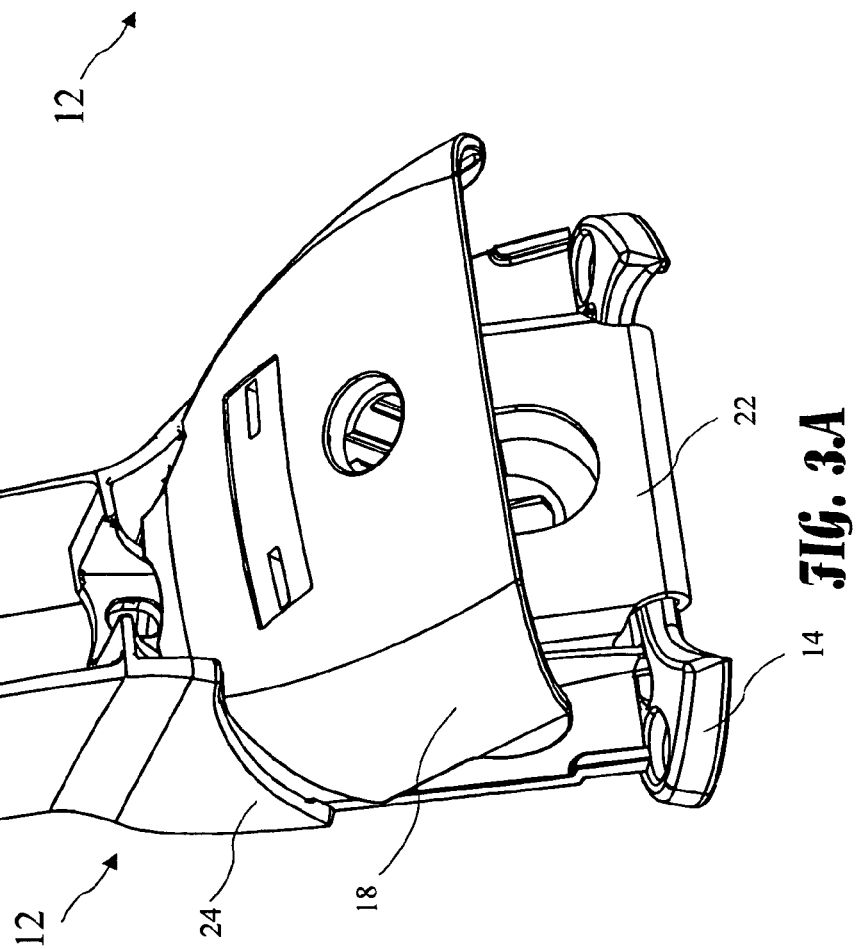

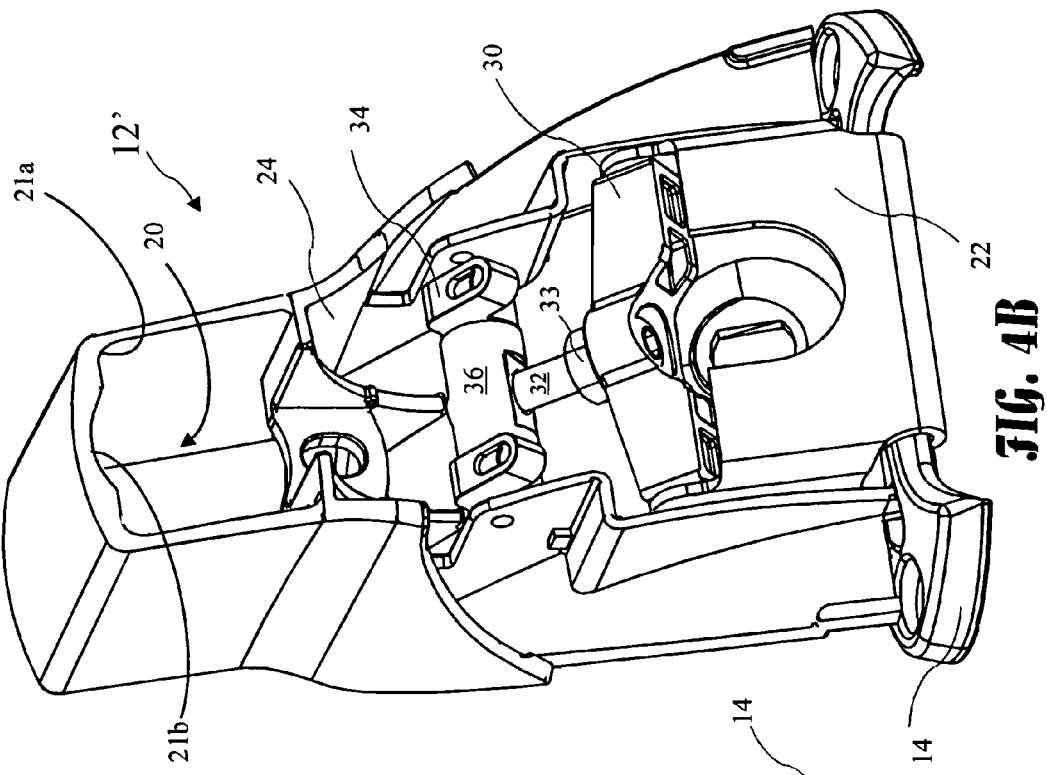
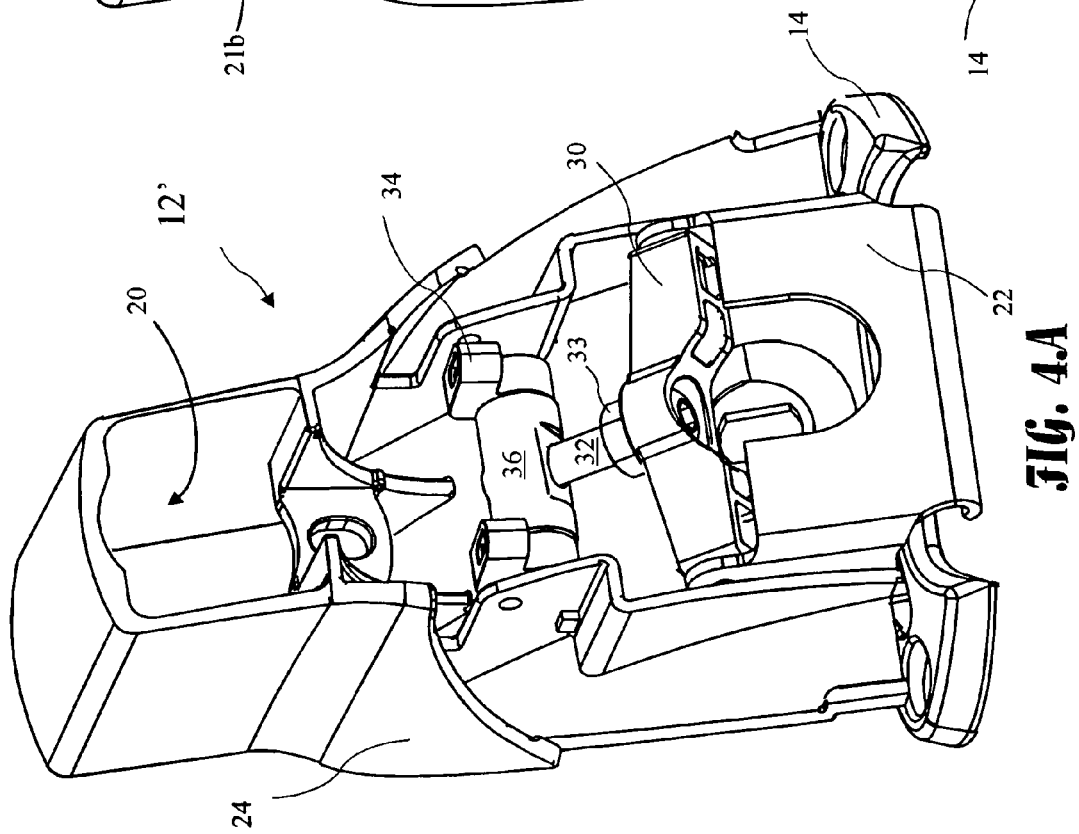

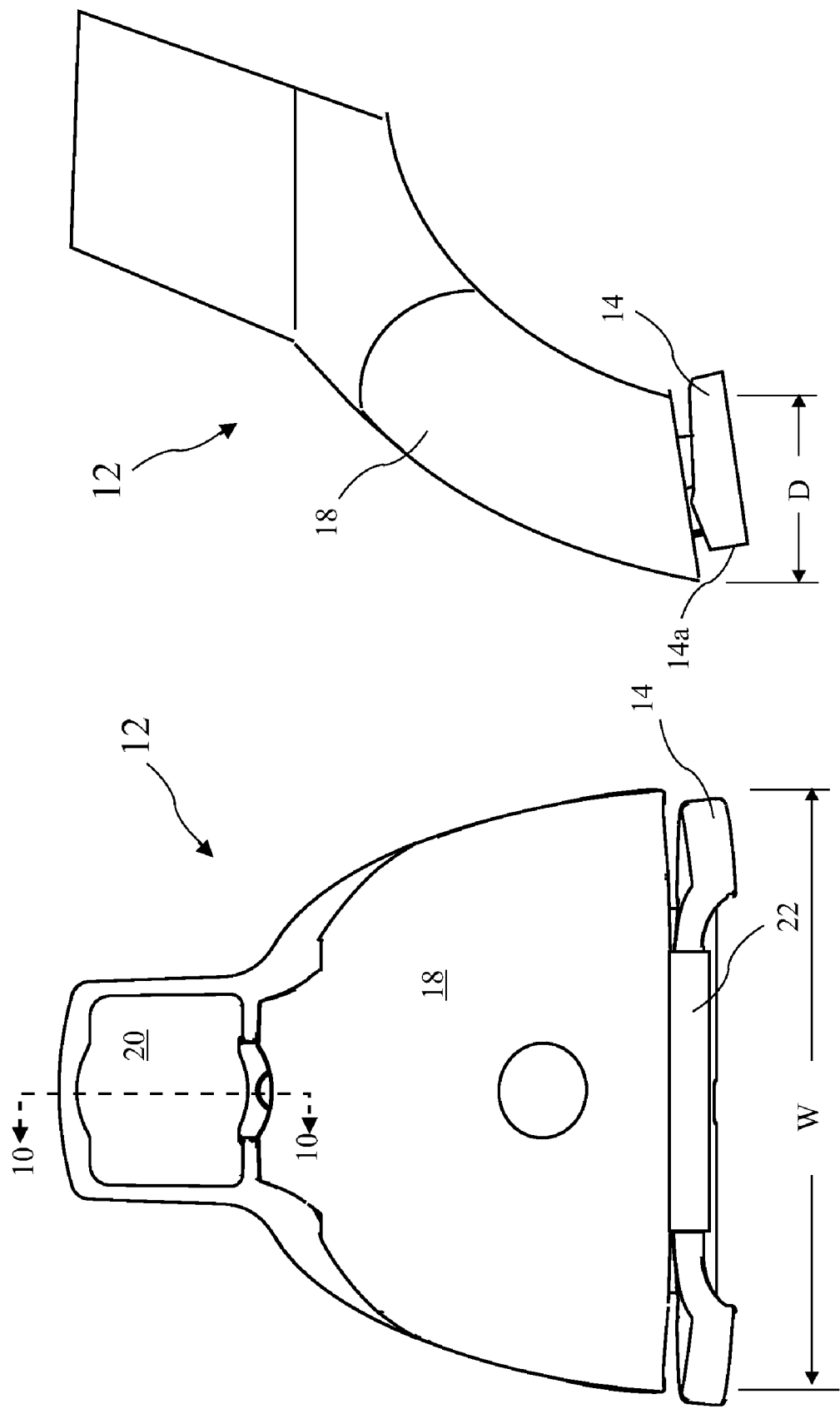

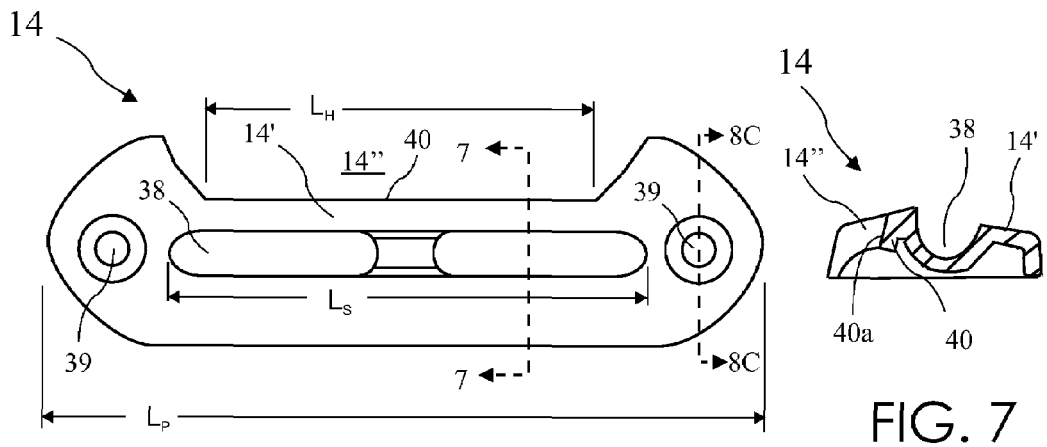
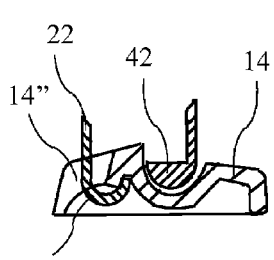
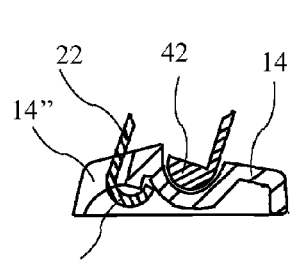
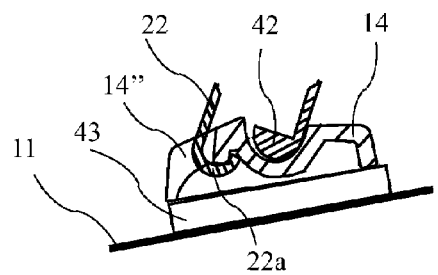
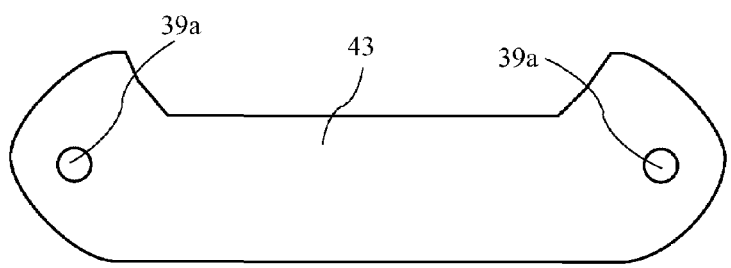
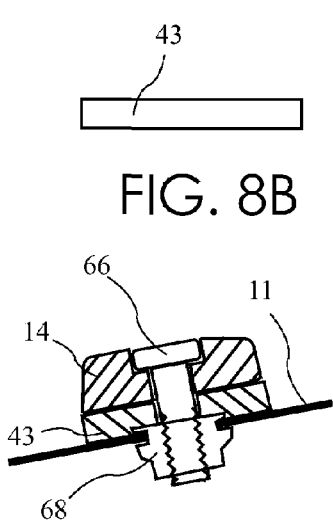

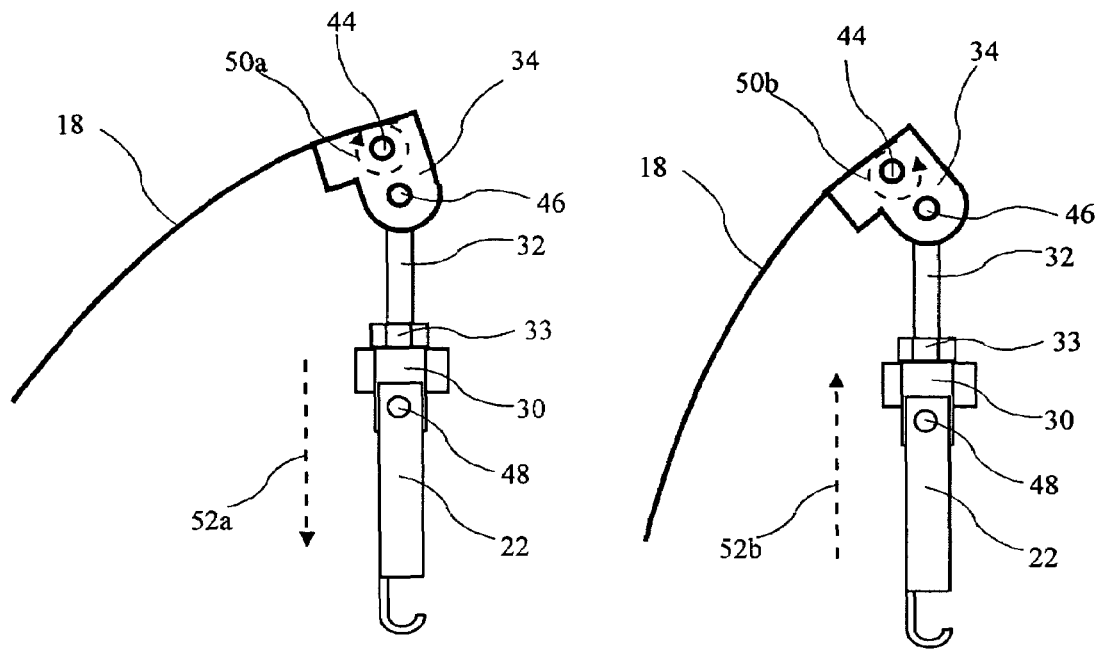
*FIG. 9A*   *FIG. 9B*
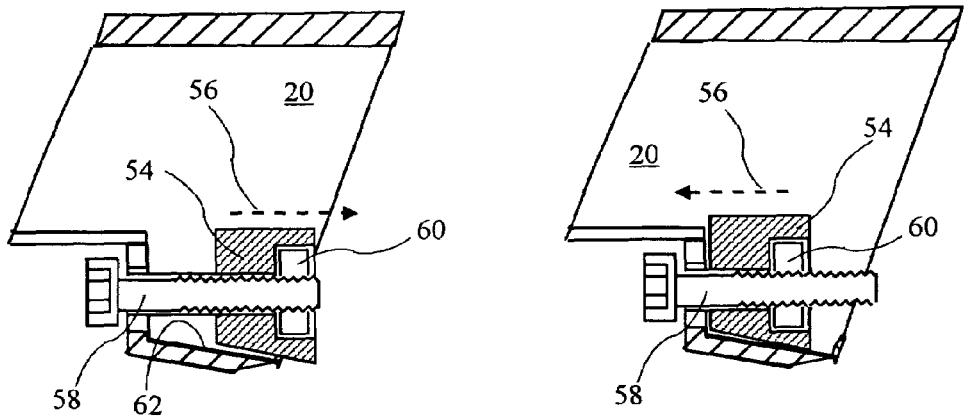
*FIG. 10A*   *FIG. 10B*

UNIVERSAL REMOVABLE ROOF RACK MOUNTING SYSTEM

BACKGROUND OF THE INVENTION

The present invention relates to automobile roof racks, and in particular to a universal removable roof rack mounting system allowing simple attachment and removal of roof racks.

Although the primary purpose of most automobiles is personal transportation, there is also a frequent need to transport other items such as sporting equipment and luggage. Often, these items are too large to fit within the automobile interior or within a trunk, or the items are likely to damage the interior if carried therein. Roof racks have been developed to enable carrying such items on the roof of an automobile.

Unfortunately, known roof racks are either permanent, or are so difficult to install and remove, that they are nearly always left on the vehicle, even though the products being carried have been removed.

When racks are present on automobile roofs, the air flow around the racks both creates drag and wind noise. With increasing fuel costs, drivers are reluctant to add mileage reducing drag to their automobiles. Further, drivers of most automobiles are accustomed to a quiet driving experience, and find excessive wind noise to be unacceptable.

Known roof racks often present a clumsy and unattractive appearance when attached to modern automobiles. Many drivers view their automobiles as creating an image or personification of themselves. Many of the same drivers participate in sports like snow skiing or mountain bike riding, which often requires a roof rack for carrying skis, bikes, or similar sports gear. The appearance of known racks left on the vehicle after the gear has been removed, produces an image nearly opposite the drivers intent, and is therefore unacceptable to many drivers.

Known roof racks require the rack dealer to stock hundreds of stock keeping units. Even with this extensive inventory, it is almost impossible to have some parts in stock. This results in calling the rack manufacturer, delays in providing the rack to the end customer, and in some cases, losing the sale.

Therefore, a need remains for a removable roof rack mounting system which is easily installed and removable and does not include unsightly permanently attached hardware. There is a further need that such mounting system is universally suitable for a wide variety of vehicles.

BRIEF SUMMARY OF THE INVENTION

The present invention addresses the above and other needs by providing a universal roof rack mounting system including small, nearly imperceptible, permanently attached pads and removable cross bar towers. The pads extend only about one quarter inch from an automobile roof and may be painted to match the color of the roof. The cross bar towers may be quickly and easily attached and detached from the pads, and the cross bar towers include a passage which accepts known roof rack cross bars including, both round and rectangular cross bars. A latching action between the pads and the cross bar towers allows a range of cross bar tower lean angles, thereby allowing the mounting system to adapt to any vehicle roof. The cross bar towers include locking release covers, and the cross bar towers are easily removed, with or without cross bars attached, by unlocking and lifting the tower covers. In many cases, the entire rack system can be lifted off as a unit, saving disassembly and reassembly time.

In accordance with one aspect of the invention, there is provided a roof rack system comprising pads adapted to mount on a motor vehicle roof, and removable cross bar towers which attach to the pads. The cross bar towers comprise tower bodies, cross bar passages through the tower bodies, and outward facing covers. The covers are pivotable to a closed position to clamp the towers to the pads and are pivotable to an open position to release the towers from the pads. The towers include pad hooks mechanically linked to the tower bodies, and the pads include hook ledges, wherein pivoting the cover to the closed position moves the pad hooks into contact with the hook ledge, and pivoting the cover to the open position moves the pad hooks away from the hook ledge. The covers are attached to cover eccentrics and the cover eccentrics rotate in the tower bodies about eccentric axles. Hook wrists are attached to the cover eccentrics and rotate about wrist axles displaced from the eccentric axles wherein opening the covers causes the wrist axles to move toward a vertical alignment with the eccentric axles, and closing the cover causes the wrist axles to move away from a vertical alignment with the eccentric axles. The pad hooks are mechanically linked to the hook wrists wherein a vertical motion of the hook wrists is coupled into a vertical motion of the pad hooks.

In accordance with another aspect of the invention, there is provided a roof rack system comprising pads adapted to permanently mount on a motor vehicle roof, and removable cross bar towers. The cross bar towers comprise tower bodies, cross bar passages through the tower bodies, and outward facing covers. The covers are pivotable to a closed position to attach the towers to the pads and are pivotable to an open position to release the towers from the pads. The tower bodies include feet, and the pads include seats for seating the feet on the pads, wherein the feet pivotally cooperate with the seats, and wherein the feet remain in cooperation with the seats when the tower bodies are leaned.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3A a perspective view of the cross bar tower with a cross bar tower cover open.

FIG. 3B a perspective view of the cross bar tower with the cross bar tower cover closed.

FIG. 4A a perspective view of the cross bar tower with the cross bar tower cover removed and a pad hook in an open position.

FIG. 4B a perspective view of the cross bar tower with the cross bar tower cover removed and the pad hook in a closed position.

FIG. 5A is a front view of the cross bar tower and pad.

FIG. 5B is a side view of the cross bar tower and pad.

FIG. 6 is a top view of the pad.

FIG. 7 is a cross-sectional view of the pad taken along line 7-7 of FIG. 6.

FIG. 7A is a cross-sectional view of the pad taken along line 7-7 of FIG. 6 with a pad hook engaging a hook ledge of the pad, and a tower foot resting in a seat of the pad.

FIG. 7B is a cross-sectional view of the pad taken along line 7-7 of FIG. 6 with a pad hook engaging a hook ledge of the pad, and a tower foot resting in a seat of the pad with the pad hook and tower hook leaning.

FIG. 7C is a cross-sectional view of the pad taken along line 7-7 of FIG. 6 with a pad hook engaging a hook ledge of the pad, and a tower foot resting in a seat of the pad with the pad hook and tower hook leaning and the pad leaning in an opposite direction.

FIG. 8A is a top view of a pad gasket.

FIG. 8B is a side view of the pad gasket.

FIG. 8C is a cross-sectional view of the pad and pad gasket bolted to the roof, taken along line 8C-8C of FIG. 6.

FIG. 9A is a side view showing the cover in mechanical cooperation with the pad hook in a open position.

FIG. 9B is a side view showing the cover in mechanical cooperation with the pad hook in a closed position.

FIG. 10A is a cross-sectional view taken along line 10-10 of FIG. 5A with a cross bar wedge in a loose position.

FIG. 10B is a cross-sectional view taken along line 10-10 of FIG. 5A with a cross bar wedge in a tight position.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
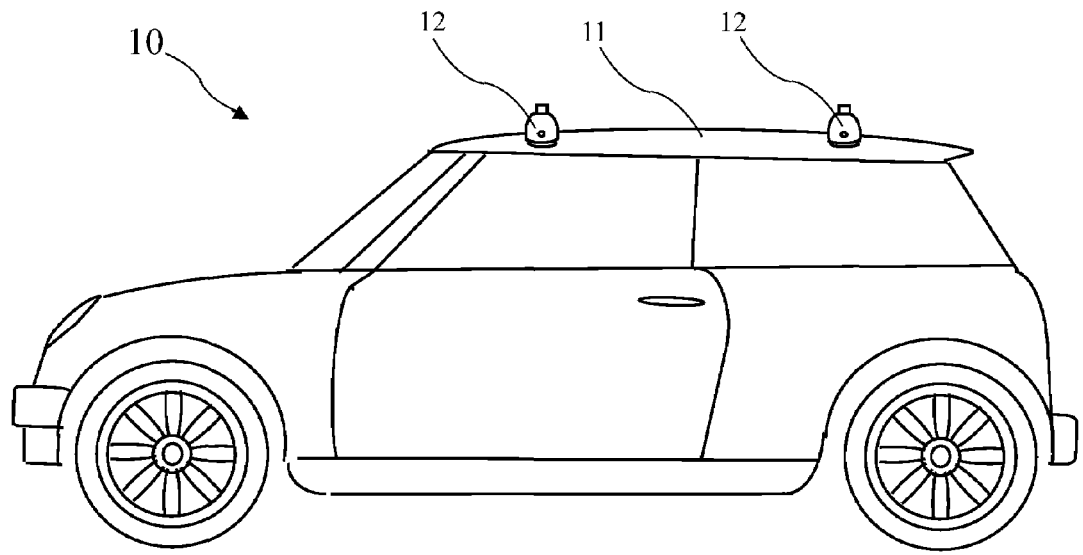
FIG. 1A is a side view of a motor vehicle with cross bar towers, according to the present invention, attached to a roof of the motor vehicle.
Figure 1B:
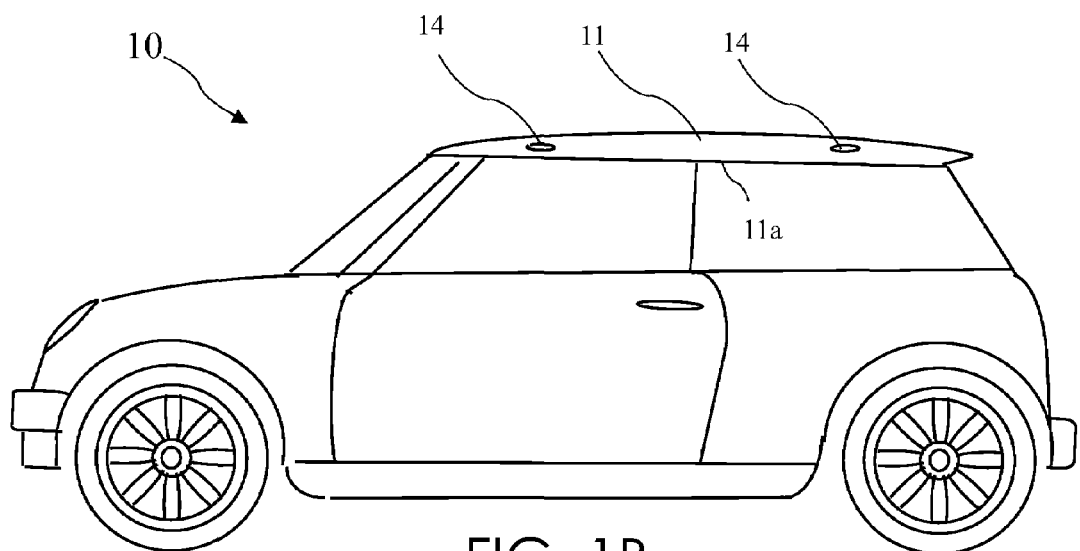
FIG. 1B is a side view of the motor vehicle with the cross bar towers detached and with pads remaining on the roof.
Figure 2B:
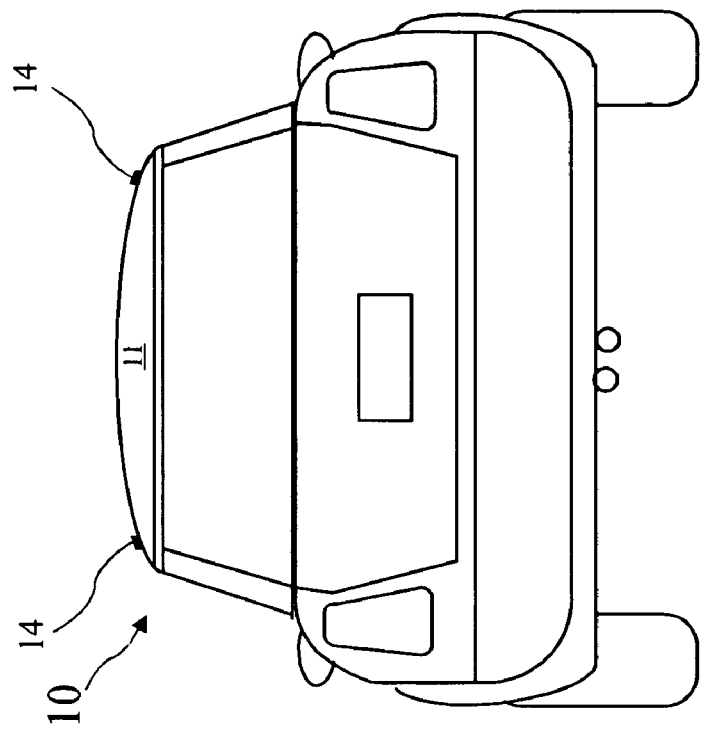
FIG. 2B is a rear view of the motor vehicle with the cross bar towers detached and with the pads remaining on the roof.
Figure 2A:
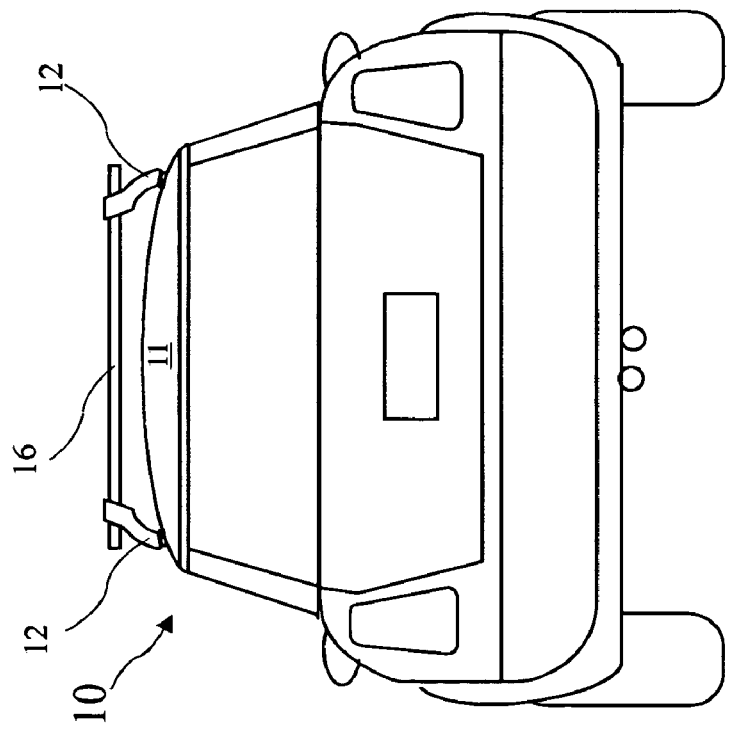
FIG. 2A is a rear view of the motor vehicle with the cross bar towers attached to the roof of the motor vehicle.

A side view of a motor vehicle 10 with cross bar towers 12 according to the present invention attached to a roof 11 of the motor vehicle 10 is shown in FIG. 1A, and a side view of the motor vehicle 10 with the cross bar towers 12 detached and with longitudinally spaced apart pads 14 remaining on the roof 11 is shown in FIG. 1B. A rear view of the motor vehicle 10 with the cross bar towers 12 attached to a roof 11 of the motor vehicle 10 is shown in FIG. 2A, and a rear view of the motor vehicle 10 with the cross bar towers 12 detached and with laterally spaced apart pads 14 remaining on the roof 11 is shown in FIG. 2B with pad outside edges 14a (see FIG. 5B) towards a roof outside edge 11a. The cross bar towers 12 support cross bars 16 suitable for carrying a variety of items such as sporting equipment and luggage carriers. The pads 14 are small having approximately the same width as the towers 12, low profile, and may be painted to match the roof 11, thus nearly disappearing when the towers 12 are detached. The towers 12 may be individually removed, or may be removed as units with cross bars 16 and other accessories attached. The towers 12 are detached from the pads 14 by simply opening a cover 18 (see FIGS. 3A and 3B). The roof rack mounting system according to the present invention thus provides a roof rack system which avoids the drawbacks of known roof racks.

A perspective view of the cross bar tower 12 with the cross bar tower cover 18 open is shown in FIG. 3A, and a perspective view of the cross bar tower 12 with the cross bar tower cover 18 closed is shown in FIG. 3B. The tower 12 rests on the pad 14, and a pad hook 22 grasps the pad 14 when the cover 18 is closed, and the pad hook 22 releases the pad 14 when the cover 18 is opened. A lock passage 26 is provided in the cover 18 to allow a key actuated lock to be fitted to the tower 12, whereby the cover 18 may be locked in the closed position.

The lock preferably passes though the pad hook 22 and engages a back surface of the tower body 24, thus providing a locking feature to retain the towers 12 on the pads 14. A label indent 28 is provided to attach a label to the cover 18, which label may be used to cover screws use to assemble the tower 12.

A perspective view of the cross bar tower 12' with the cross bar tower cover 18 removed and the pad hook 22 in an open position is shown in FIG. 4A, and a perspective view of the cross bar tower 12' with the cross bar tower cover 18 removed and the pad hook 22 in a closed position (grasping the pad 14) is shown in FIG. 4B. The pad hook 22 is pivotally attached to a hook link 30, and the hook link 30 is connected to a hook wrist 36 by a link bolt 32. The link bolt 32 slidably cooperates with the hook link 30, wherein the link bolt 32 turns in the hook link 30 without advancing or retreating with respect to the hook link 30. A link nut 33 is preferably threadably positioned on the link bolt 32 to establish the position of the link bolt 32 with respect to the hook link 30. The link nut 33 is preferably a locking nut, and more preferably a nut with a nylon locking feature.

Continuing with FIGS. 4A and 4B, the hook wrist 36 is pivotally connected to cover eccentrics 34, and the cover eccentrics 34 are pivotally connected to a tower body 24. The cover 18 is attachable to the cover eccentrics 34. The mechanical cooperation of the cover 18 and pad hook 22 is described in FIGS. 9A and 9B. Cross bar passages 20 are provided for the cross bars 16 (see FIG. 2A). The passages 20 include corners 21a which are adapted to cooperate with substantially rectangular cross bars, and rounded surfaces 20b adapted to cooperate with round cross bars. The towers 12 are thus suitable for either round or rectangular cross bars.

A front view of the cross bar tower 12 engaging the pad 14 is shown in FIG. 5A, and a side view of the cross bar tower 12 engaging the pad 14 is shown in FIG. 5B. The cover 18 widens as it extends downward to the pad 14 and the portion of the cover 18 (or the tower 12 as a whole) proximal to the pad 14 has approximately the same width W as the pad 14 and the same depth D as the pad 14.

A top view of the pad 14 is shown in FIG. 6. The pads 14 are preferably permanently mounted to a roof 11 using screws through counter-sunk mounting holes 39. A cross-sectional view of the pad taken along line 7-7 of FIG. 6, is shown in FIG. 7. The pad 14 includes seats 38, a hook ledge 40, and an outward face 40a of the hood ledge 40, the outward face 40a along a recessed area 14" on the outward side of the perimeter of the pad 14. The pads 14 are approximately ¼ inch high and may be painted to match the roof 11 (see FIG. 1B). The seat 38 allows the tower 12 to be installed from directly above, and not requiring sliding the tower 12 onto the pad 14 from the side. The hook ledge 40 is seen to be only slightly laterally separated from the seat 38. Further, because of the slight separation of the hook ledge 40 from the seat 38, only slight adjustment of the length of the latching mechanism (see FIGS. 9A and 9B) is required to compensate for the slope of the vehicle roof 11 allowing a compact latching mechanism.

A cross-sectional view of the pad taken along line 7-7 of FIG. 6 with a pad hook 22 engaging the hook ledge 40 of the pad 14, and a tower foot 42 resting in the seat 38 of the pad 14, is shown in FIG. 7A. The pad hook 22 hooks under the hook ledge 40 to grasp the pad 14, and the foot 42 rests in the seat 38 to support the tower 12. Generally, even with a flat roof 11, the tower 12 must lean to align the cross bar passage 20 (see FIGS. 4A and 4B) in opposing towers 12. A second cross-sectional view of the pad 14 taken along line 7-7 of FIG. 6 with the pad hook 22 engaging the hook ledge 40 of the pad 14, and the tower foot 42 resting in the seat 38 of the pad 14, with the pad hook 22 and tower foot 42 leaning (or pivoted) to allow for the slope of the roof 11 (see FIG. 1), is shown in FIG. 7B.

A cross-sectional view of the pad taken along line 7-7 of FIG. 6 with a pad hook 22 engaging the hook ledge 40 of the pad 14, and a tower foot 42 resting in a seat 38 of the pad 14 is shown in FIG. 7C. The pad hook 22 and tower foot 42 are leaning in one direction, and the pad 14 is leaning in an opposite direction, as might be expected on a typical roof 11 (see FIG. 2A). A pad gasket 43 resides between the pad 14 and the roof 11 to protect the roof 11 from damage, and to conform to a slight curvature of the roof 11. In the examples shown in FIGS. 7A, 7B, and 7C, the hooked bottom end 22a of the pad hook 22 is seen to not extend outside the recessed area 14" when the pad hook 22 is hooked under the hook ledge 40. The pad 14 has a pad length $L_P$, the hook ledge 40 has a hook length $L_H$, and the seat 38 has a seat length $L_S$.

A cross-sectional view of the pad 14 and pad gasket 43 mounted to the roof 11, taken along line 8C-8C of FIG. 6, is shown in FIG. 8C. The pad 14 with pad gasket 43 are preferably permanently attached to the roof 11 using a machine screw 66 passing through the pad 14 and pad gasket 43 and into an expanding nut 68 inserted through holes drilled in the roof 11. The expanding nut 68 is preferably a swedge nut, but may be any nut which may be inserted through a blind hole, and manipulated to allow a screw to be tightened into the nut.

A top view of the pad gasket 43 is shown in FIG. 8A, and a side view of the pad gasket 43 is shown in FIG. 8B. The pad 43 is preferably made from rubber, and more preferably from 70 to 90 hardness rubber.

A simplified side view showing the cover 18 in mechanical cooperation with the pad hook 22 in a open position is shown in FIG. 9A, and a side view showing the cover 18 in mechanical cooperation with the pad hook 22 in a closed position is shown in FIG. 9B. The pad hook 22 is pivotally connected (i.e., mechanically linked) to the hook link 30 by a link axle 48. The link bolt 32 is rotatably retained in the hook link 30 by the link nut 33. The link bolt 32 is screwed into the hook wrist 36 (see FIGS. 4A and 4B), and the hook wrist 36 is pivotally connected to the cover eccentrics 34 by wrist axles 46. The cover eccentrics 34 are pivotally connected to the tower body 24 (see FIGS. 4A and 4B) by eccentric axles 44, and the cover 18 is attached to the cover eccentrics 34.

The cover 18 is pivoted along arc 50a into an open position in FIG. 9A, with the pad hook 22 moved down along arrow 52a to release the pad 14. The cover 18 is pivoted along arc 50b into a closed position in FIG. 9B, with the pad hook 22 moved upward along arrow 52b to grasp the pad 14. Thus, the hook wrists 36 are attached to the cover eccentrics 34 and rotate about wrist axles 46 which are displaced from the eccentric axles 44 wherein opening the covers 18 causes the wrist axles 46 to move toward a vertical alignment with the eccentric axles 44, and closing the cover 18 causes the wrist axles 46 to move away from a vertical alignment with the eccentric axles 44. Such motion causes the pad hook 22 to release the pad 14 (when the wrist axles 46 and the eccentric axles 44 are more vertically aligned) or to grasp the pad 14 (when the wrist axles 46 and the eccentric axles 44 are less vertically aligned). The link bolt 32 may be advanced into the link wrist 36 to tighten the grasp of the pad hook 22 on the pad 14, or the link bolt 32 may be retreated from the link wrist 36 to loosen the grasp of the pad hook 22 on the pad 14. Thus the towers 12 may be adjusted for various tilts.

A cross-sectional view taken along line 10-10 of FIG. 5A with a cross bar wedge 54 in a loose position is shown in FIG. 10A, and a cross-sectional view taken along line 10-10 of FIG. 5A with a cross bar wedge 54 in a tight position is shown in FIG. 10B. The cross bar wedge 54 slides on a ramp 62 inside the cross bar passage 20. A wedge bolt 58 is screwed into a wedge nut 60 held in the cross bar wedge 54. When the wedge bolt 58 is tightened, the cross bar wedge 54 is pulled up the ramp 62, thus grasping a cross bar 16 (see FIG. 2A) residing in the cross bar passage 20.

While the invention herein disclosed has been described by means of specific embodiments and applications thereof, numerous modifications and variations could be made thereto by those skilled in the art without departing from the scope of the invention set forth in the claims.

We claim:

1. A roof rack system comprising:
   pairs of opposing pads adapted to mount on opposite sides of a motor vehicle roof, each pad including:
      a pad outside edge defining a portion of a closed perimeter surrounding each pad, the pads configured for positioning on the motor vehicle roof with the pad outside edges towards roof outside edges of the vehicle roof;
      a widthwise rounded concave seat having a seat length $L_S$ extending lengthwise into a top surface of the pad;
      a hook ledge comprising an outward facing hook ledge face portion of the closed perimeter along the pad outside edge and an adjacent downward facing portion and running parallel to the concave seat;
      each pad residing on a top surface of the vehicle roof and each pad independently attached to the vehicle by screws; and
   wherein:
      the roof rack system is an aftermarket roof rack system configured for installation on a variety of vehicles;
      each pad is independently attached to the vehicle by screws engaging expanding nuts; and
      the expanding nuts are installed in the vehicle roof through a blind hole after the vehicle is manufactured;
   pairs of pivotable cross bar towers, each of the towers attachable to one of the pads, at least one portion of each tower having a width W, the width W wider than the seat length $L_S$ of the seats, each cross bar tower including:
      a tower foot supporting the tower and having a rounded base for pivotal cooperation with the rounded concave seats for allowing the towers to pivot in the seats to accommodate different vehicle roof slopes;
      a pad hook reaching under the hook ledge face and cooperating with the hook ledge to grasp the pad, the pad hooks grasping the hook ledges of the pad;
      an outward facing cover attached to cover eccentrics, which cover eccentrics rotate in the tower bodies about eccentric axles, which cover is pivotable to a closed position to lift the pad hook to engage the hook ledge to attach the towers to the pads and pivotable to an open position to lower the pad hook to release the hook ledge to release the towers from the pads;
      hook wrists mechanically linked to the cover eccentrics and rotatable about wrist axles displaced from the eccentric axles wherein opening the covers causes the wrist axles to move toward a vertical alignment with the eccentric axles, and closing the cover causes the wrist axles to move away from a vertical alignment with the eccentric axles, the pad hooks mechanically linked to the hook wrists, wherein the pad hooks are mechanically linked to link bolts through hook links, wherein the link bolts threadedly cooperate with the hook wrist to adjust the contact of the pad hooks with the hook ledges and the link bolts slidably cooperate with hook links, wherein the link bolts turn within the hook links without translating relative to the hook links, and wherein the pad hooks are pivotally attached to the hook links, thereby allowing adjustment for lean of the towers with respect to the pads to allow the towers to be adjusted for slopes of the vehicle roofs which the pads are attached to; and cross bars laterally connecting the pairs of cross bar towers.

2. The roof rack system of claim 1, wherein the portions of the towers proximal to the pads have approximately the same width W as a length $L_P$ of the pads.

3. The roof rack system of claim 1, wherein the towers include cross bar passages adapted to accept cross bars selected from the group consisting of substantially round cross-section cross bars and substantially rectangular cross-section cross bars.

4. The roof rack system of claim 3, wherein the cross bar passage includes a ramp, wherein a cross bar wedge slidably cooperates with the ramp, thereby grasping a cross bar residing in the cross bar passage.

5. The roof rack system of claim 4, wherein the towers include tower bodies, wherein the cross bar wedge is connected to the tower body by a wedge bolt, wherein turning the wedge bolt causes the cross bar wedge to slide on the ramp, thereby grasping the cross bar.

6. The roof rack system of claim 1, wherein:

the towers include an adjustable latching mechanism for adjusting the engagement of the pad hook with the hook ledge;

the hook ledge is only slightly laterally separated from the concave seat; and because of the slight separation of the hook ledge from the seat, only slight adjustment of the length of the latching mechanism is required to compensate for the slope of the vehicle roof allowing a compact latching mechanism and thereby allowing adjustment for lean of the towers with respect to the pads to allow the towers to be adjusted for slopes of the vehicle roofs which the pads are attached to.

7. A roof rack system comprising:

four longitudinally and laterally spaced apart pads adapted to permanently mount on a motor vehicle roof for providing support for the roof rack system, each pad including:

a pad outside edge defining a recessed area of a closed pad perimeter surrounding each pad, the pads configured for positioning on the motor vehicle roof with the pad outside edge towards roof outside edges of the vehicle roof;

a widthwise rounded concave seat extending lengthwise into a top surface of the pad; and a hook ledge having an outward facing hook ledge face portion along an inside edge of the recessed area of the pad perimeter and an adjacent downward facing portion and running parallel to the concave seat;

removable cross bar towers comprising:

tower bodies;

cross bar passages through the tower bodies;

a tower foot supporting the tower and having a rounded base for pivotal cooperation with the rounded concave seats for allowing the towers to pivot in the seats to accommodate different vehicle roof slopes;

a pad hook reaching under the hook ledge face and cooperating with the hook ledge to grasp the pad, the pad hooks grasping the hook ledges of the pad, a hooked bottom end of the pad hook not extending outside the recessed area when the pad hook is hooked under the hook ledge;

outward facing covers attached to cover eccentrics, which cover eccentrics rotate in the tower bodies about eccentric axles, and wherein the covers are pivotable on the tower bodies to a closed position to lift the pad hook to engage the hook ledge to clamp the towers to the pads and are pivotable on the tower bodies to an open position to lower the pad hook to release the hook ledge to release the towers from the pads; and hook wrists mechanically linked to the cover eccentrics and rotatable about wrist axles displaced from the eccentric axles wherein opening the covers causes the wrist axles to move toward a vertical alignment with the eccentric axles, and closing the cover causes the wrist axles to move away from a vertical alignment with the eccentric axles, the pad hooks mechanically linked to the hook wrists, wherein the pad hooks are mechanically linked to link bolts through hook links, wherein the link bolts threadedly cooperate with the hook wrist to adjust the contact of the pad hooks with the hook ledges and the link bolts slidably cooperate with hook links, wherein the link bolts turn within the hook links without translating relative to the hook links, and wherein the pad hooks are pivotally attached to the hook links, thereby allowing adjustment for lean of the towers with respect to the pads to allow the towers to be adjusted for slopes of the vehicle roofs which the pads are attached to; and cross bars connecting pairs of cross bar towers.

8. The roof rack system of claim 7, wherein the portions of the covers proximal to the pads have approximately the same width W as the pads.

9. The roof rack system of claim 7, wherein the portions of the covers proximal to the pads have approximately the same depth D as the pads.

10. The roof rack system of claim 7, wherein the towers include cross bar passages adapted to accept cross bars selected from the group consisting of substantially round cross-section cross bars and substantially rectangular cross-section cross bars.

11. The roof rack system of claim 10, wherein the cross bar passages include ramps, wherein cross bar wedges slidably cooperate with the ramps, thereby grasping cross bars residing in the cross bar passages.

12. The roof rack system of claim 7, wherein the towers include tower bodies, wherein the cross bar wedge is connected to the tower body by a wedge bolt, wherein turning the wedge bolt causes the cross bar wedge to slide on the ramp, thereby grasping the cross bar.

13. The roof rack system of claim 7, wherein:

each pad resides on a top surface of the vehicle roof and each pad is independently attached to the vehicle by screws;

the roof rack system is an aftermarket roof rack system configured for installation on a variety of vehicles;

each pad is independently attached to the vehicle by screws engaging expanding nuts; and the expanding nuts are installed in the vehicle roof through a blind hole after the vehicle is manufactured.

14. A motor vehicle and roof rack comprising:

a vehicle roof;

pairs of opposing pads adapted to mount on opposite sides of the vehicle roof, each pad including:

a pad outside edge defining a portion of a closed perimeter surrounding each pad, the pads configured for positioning on the motor vehicle roof with the pad outside edges towards roof outside edges of the vehicle roof;

a widthwise rounded concave seat having a seat length $L_S$ extending lengthwise into a top surface of the pad;

a hook ledge comprising an outward facing hook ledge face portion of the closed perimeter along the pad outside edge and an adjacent downward facing portion and running parallel to the concave seat; and each pad residing on a top surface of the vehicle roof and each pad independently attached to the motor vehicle by screws, wherein:
- the roof rack is an aftermarket roof rack configurable for installation on a variety of vehicles;
- each pad is independently attached to the vehicle roof by screws engaging expanding nuts; and
- the expanding nuts are installed in the vehicle roof through a blind hole after the vehicle is manufactured;

pairs of pivotable cross bar towers, each of the towers attachable to one of the pads, at least one portion of each tower having a width W, the width W wider than the seat length $L_S$ of the seats, each cross bar tower including:
- a tower foot supporting the tower and having a rounded base for pivotal cooperation with the rounded concave seats for allowing the towers to pivot in the seats to accommodate different vehicle roof slopes;
- a pad hook reaching under the hook ledge face and cooperating with the hook ledge to grasp the pad, the pad hooks grasping the hook ledges of the pad;
- an outward facing cover attached to cover eccentrics, which cover eccentrics rotate in the tower bodies about eccentric axles, which cover is pivotable to a closed position to lift the pad hook to engage the hook ledge to attach the towers to the pads and pivotable to an open position to lower the pad hook to release the hook ledge to release the towers from the pads;
- hook wrists mechanically linked to the cover eccentrics and rotatable about wrist axles displaced from the eccentric axles wherein opening the covers causes the wrist axles to move toward a vertical alignment with the eccentric axles, and closing the cover causes the wrist axles to move away from a vertical alignment with the eccentric axles, the pad hooks mechanically linked to the hook wrists, wherein the pad hooks are mechanically linked to link bolts through hook links, wherein the link bolts threadedly cooperate with the hook wrist to adjust the contact of the pad hooks with the hook ledges and the link bolts slidably cooperate with hook links, wherein the link bolts turn within the hook links without translating relative to the hook links, and wherein the pad hooks are pivotally attached to the hook links, thereby allowing adjustment for lean of the towers with respect to the pads to allow the towers to be adjusted for slopes of the vehicle roofs which the pads are attached to; and cross bars laterally connecting the pairs of cross bar towers.

15. The roof rack system of claim 14, wherein the portions of the covers proximal to the pads have approximately the same width W as the pads.

16. The roof rack system of claim 14, wherein the portions of the covers proximal to the pads have approximately the same depth D as the pads.

17. The roof rack system of claim 14, wherein the towers include cross bar passages adapted to accept cross bars selected from the group consisting of substantially round cross-section cross bars and substantially rectangular cross-section cross bars.

18. The roof rack system of claim 14, wherein the cross bar passages include ramps, wherein cross bar wedges slidably cooperate with the ramps, thereby grasping cross bars residing in the cross bar passages.

19. The roof rack system of claim 14, wherein the towers include tower bodies, wherein the cross bar wedge is connected to the tower body by a wedge bolt, wherein turning the wedge bolt causes the cross bar wedge to slide on the ramp, thereby grasping the cross bar.

* * * * *